R. B. UNDERHILL.
Apparatus for Extracting Coffee.
No. 152,309. Patented June 23, 1874.
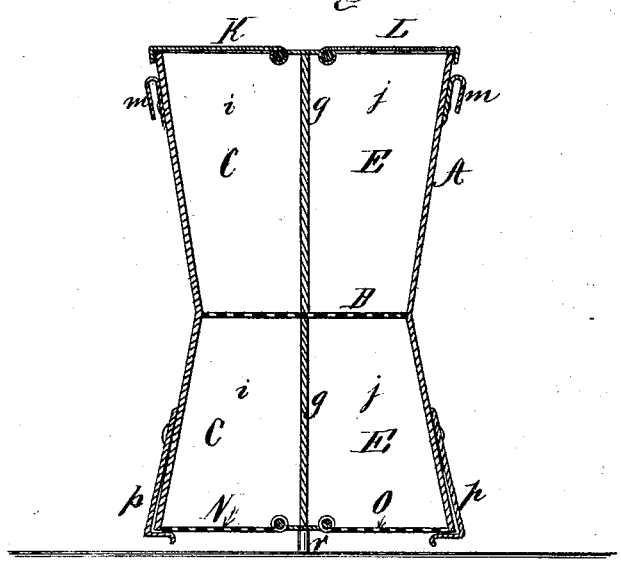
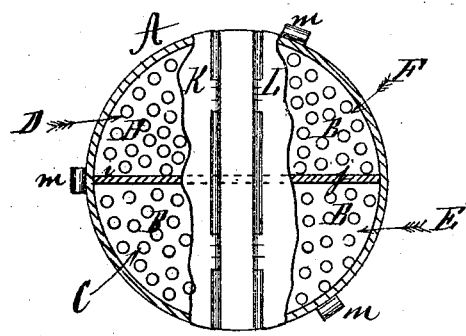
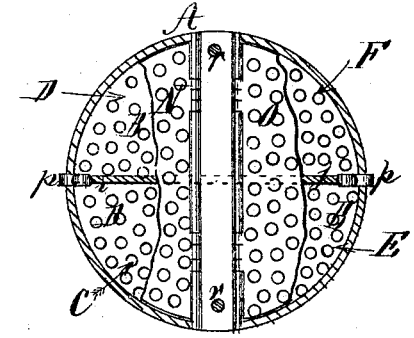
Witnesses.
Franklin Barritt.
Richard Gerner.
Inventor.
Royal B. Underhill,
Per.
Henry Gerner.
Atty

UNITED STATES PATENT OFFICE.

ROYAL B. UNDERHILL, OF CORINTH, MISSISSIPPI.

IMPROVEMENT IN APPARATUS FOR EXTRACTING COFFEE.

Specification forming part of Letters Patent No. 152,309, dated June 23, 1874; application filed May 13, 1874.

*To all whom it may concern:*

Be it known that I, ROYAL BYRON UNDERHILL, of Corinth, Alcorn county, State of Mississippi, have invented certain Improvements in Apparatus for Extracting Coffee, of which the following is a specification:

The object of my invention is to provide for an apparatus which will extract coffee and other oily substances from the ground beans in a more economical manner than heretofore done. No more of the ground beans should be once drenched with boiling water than so much as to give the required quantity of coffee. If the ground beans were a second time exposed to a diffusion of hot water, then their bitter substance would be extracted. In the commonly used coffee-extractors with a single compartment, more ground beans are generally added to the already drenched substance each time when more coffee is required, in order to avoid the cleaning of the extractor every time. To overcome these difficulties I have divided the extractor into a number of compartments, which, when filled with ground beans, may be used in turn, according to the quantity required, and by aid of which the exact quantity of good coffee may be produced.

Referring to the drawings, Figure I represents an elevated sectional view; Fig. II, a top-plan view; Fig. III, a bottom-plan view of my improved coffee-extractor.

A is the double conical cylindrical case. These cones are united at their smaller ends, while their larger ends are left open. A perforated plate, B, is placed in the interior, where both cones are united. Each cone is divided into four compartments, C, D, E, and F, by solid dividing-plates $g$, $h$, $i$, and $j$. The top cone is provided with two solid lids, K and L, which are hinged to the dividing-plates $g$ and $h$. On the outside, at or near the top of the upper cone, are placed three or more hooks, $m$ $m$, which serve to support the extractor when placed inside a coffee-pot, these hooks overlapping the rim of the same. The lower cone is provided with perforated lids N O, hinged to the dividing-plates $g$ and $h$, and held, when required, to the cone with aid of the springs $p$ $p$. $r$ $r$ are legs for the placing of the extractor on a plate after use.

To use my improved coffee-extractor, I fill the compartments C D E F in the lower cone with ground beans, close the lids N and O, and hang the extractor in a coffee-pot. If coffee is required only for one or two persons, I open the lid K and pour boiling water into the compartment C of the upper cone. If for one or two more persons, I pour water into the compartment D of the upper cone. If more coffee is wanted, the lid L is opened, and water is poured into the compartment E of the upper cone; and, finally, the fourth compartment F of the upper cone is also taken into requisition if still more coffee is wanted.

Having thus described my invention, I desire to claim—

The conical case A, with compartments C, D, E, and F, partition-plate B, solid lids K and L, and perforated lids N and O, substantially as and for the purpose set forth.

ROYAL BYRON UNDERHILL.

Witnesses:
 T. P. YOUNG, Jr.,
 F. M. BELL.